United States Patent
Hobbs et al.

(10) Patent No.: US 6,553,835 B1
(45) Date of Patent: Apr. 29, 2003

(54) INERTIAL RATE SENSOR AND METHOD WITH IMPROVED CLOCKING

(75) Inventors: Larry P. Hobbs, Brentwood, CA (US); G. Richard Newell, Walnut Creek, CA (US)

(73) Assignee: BEI Technologies, Inc., San Francisco, CA (US)

( * ) Notice: Subject to any disclaimer, the term of this patent is extended or adjusted under 35 U.S.C. 154(b) by 105 days.

(21) Appl. No.: 09/663,741

(22) Filed: Sep. 15, 2000

(51) Int. Cl.[7] .............................................. G01P 15/00
(52) U.S. Cl. ............................. 73/514.016; 73/504.016; 73/514.029
(58) Field of Search ........................ 73/504.16, 504.02, 73/504.13, 514.16, 514.15, 504.04, 1.77, 1.78, 504.08

(56) References Cited

U.S. PATENT DOCUMENTS

| | | | |
|---|---|---|---|
| 4,674,331 A | * 6/1987 | Watson | 73/505 |
| 5,343,749 A | * 9/1994 | Macy | 73/505 |
| 5,388,458 A | * 2/1995 | Weinberg et al. | 73/505 |
| 5,426,970 A | * 6/1995 | Florida et al. | 73/1 D |
| 5,554,904 A | * 9/1996 | Terajima | 310/316 |
| 5,942,686 A | 8/1999 | Bhardwaj | 73/504.16 |
| 6,155,115 A | * 12/2000 | Ljung | 73/504.12 |
| 6,324,909 B1 | * 12/2001 | Wyse et al. | 73/504.12 |

* cited by examiner

*Primary Examiner*—Daniel S. Larkin
*Assistant Examiner*—Jacques M. Saint-Surin
(74) *Attorney, Agent, or Firm*—Edward S. Wright

(57) ABSTRACT

Inertial rate sensor and method in which a drive signal is applied to a rate sensing element, a pickup circuit is coupled to the rate sensing element for providing an output signal corresponding to movement of the rate sensing element, digital logic calibrates the rate sensor and detects the occurrence of faults in the rate sensor, the rate sensing element is utilized as a frequency reference for providing a system clock signal for the digital logic, a fixed phase relationship is maintained between vibration of the rate sensing element and the system clock signal, the system clock signal is filtered to eliminate responses to spurious transitions during a period following application of operating power to the sensor, and the digital logic is reset in synchronization with the system clock signal.

48 Claims, 6 Drawing Sheets

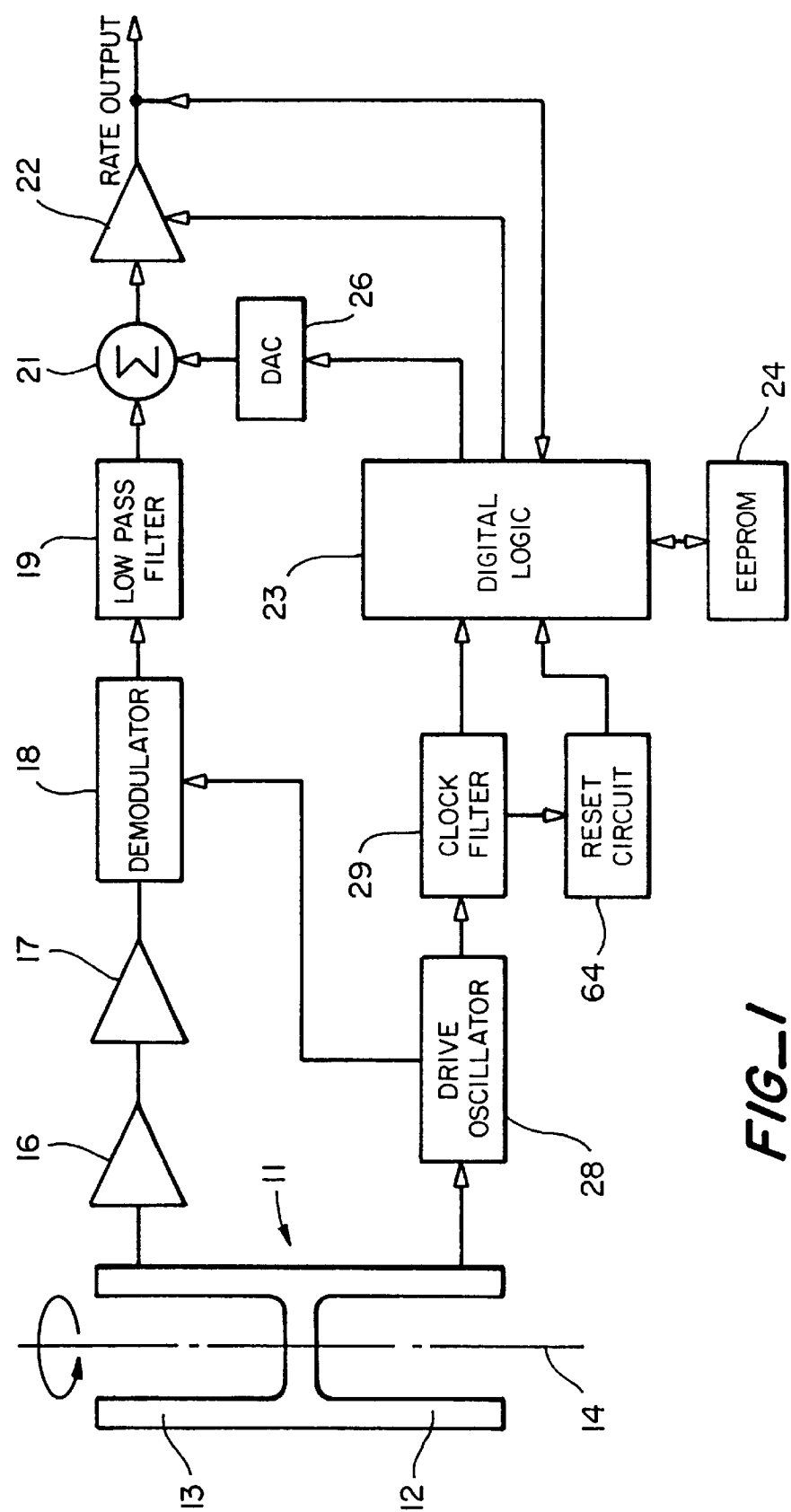
FIG_1

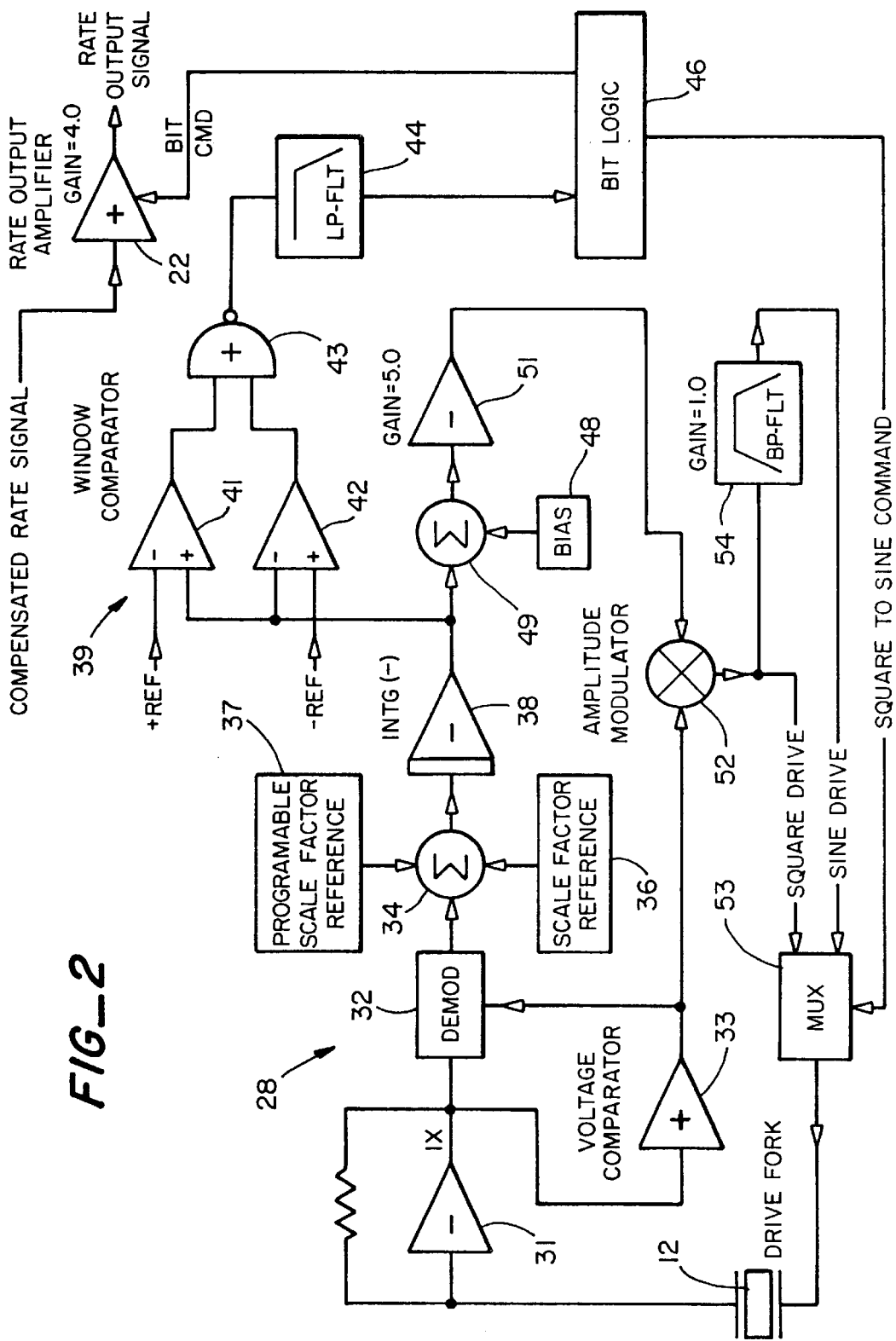
FIG_2

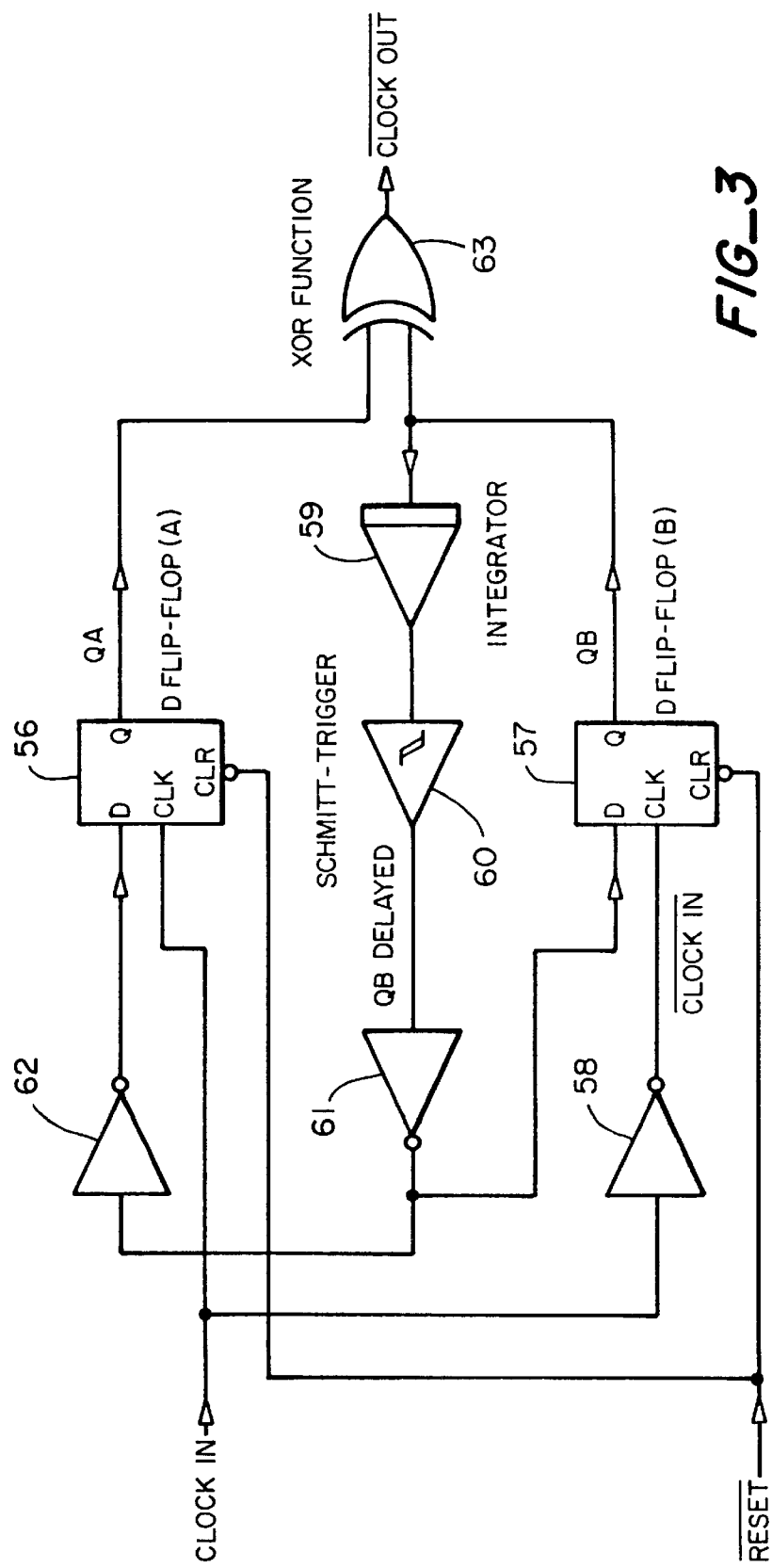
FIG_3

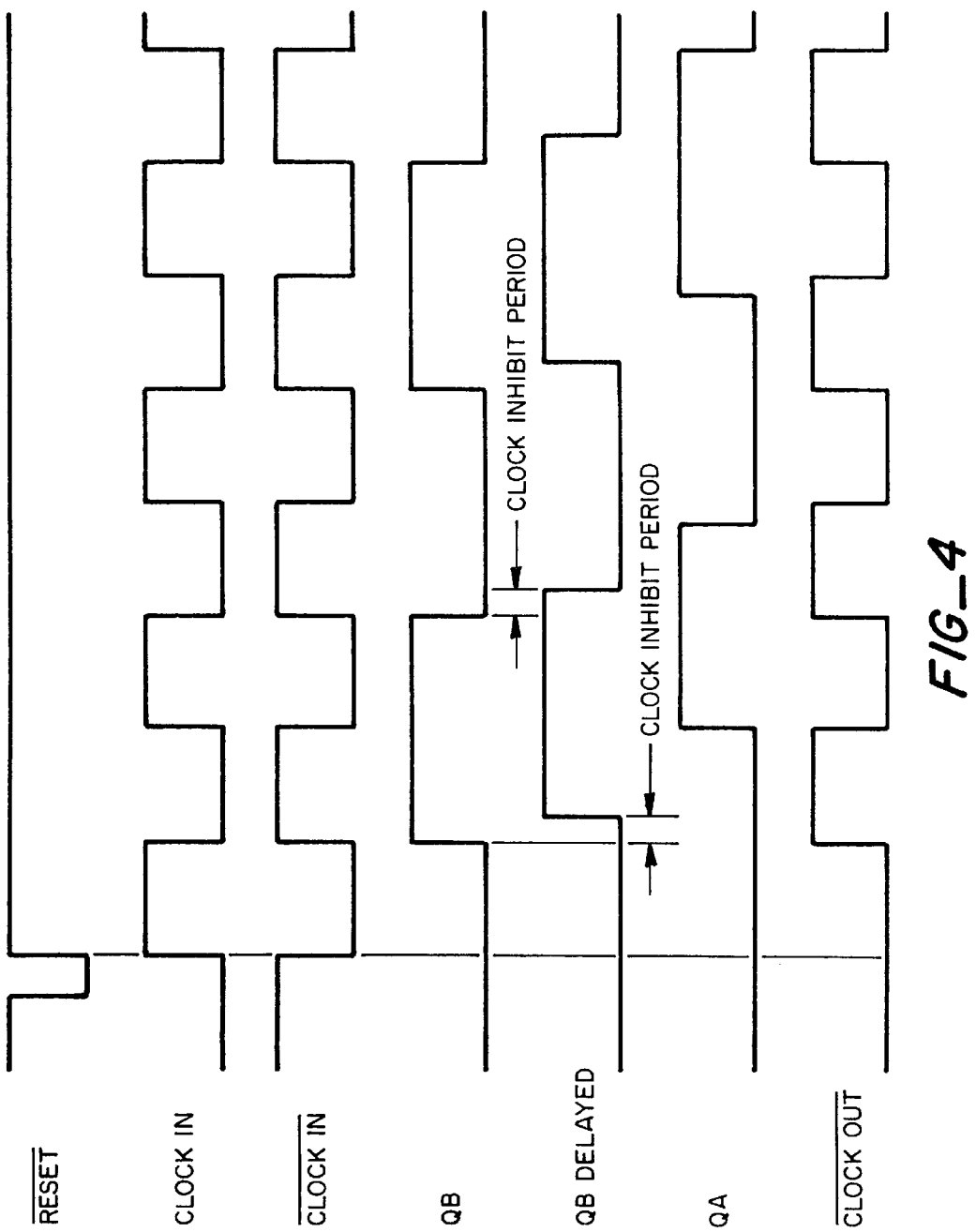
FIG_4

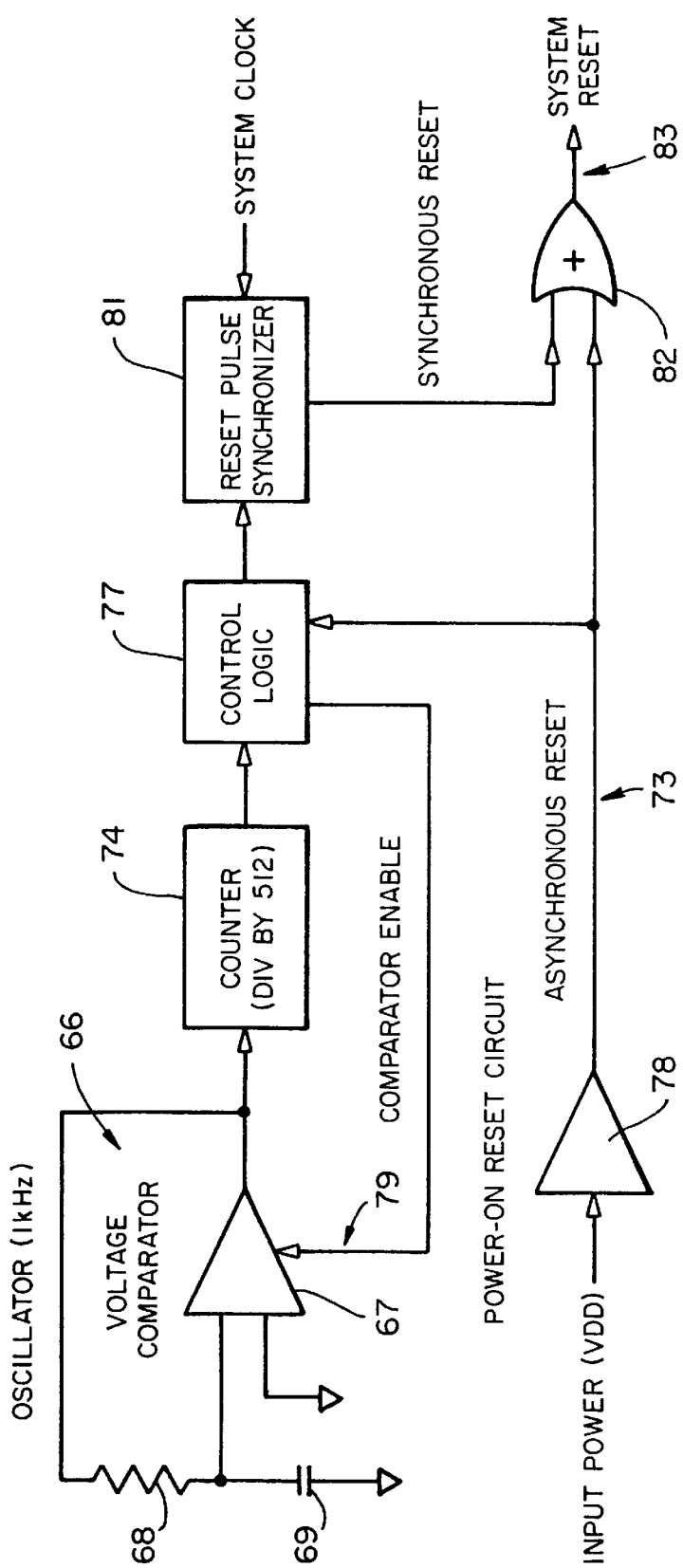
FIG_5

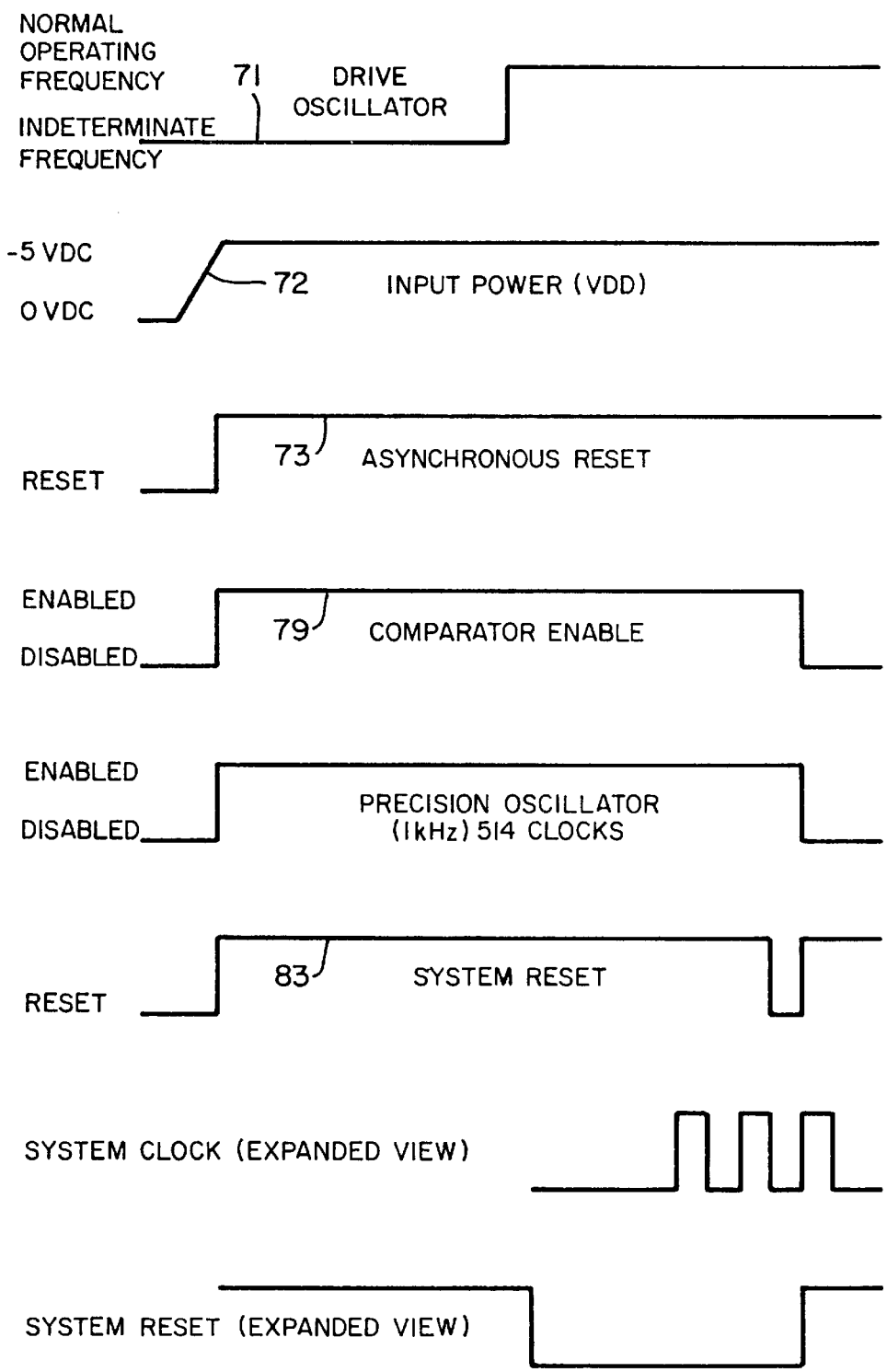
FIG_6

INERTIAL RATE SENSOR AND METHOD WITH IMPROVED CLOCKING

This invention pertains generally to inertial rate sensors and, more particularly, to an inertial rate sensor and method with improved clocking.

Inertial rate sensors are used in a wide variety of applications including aircraft navigation, the guidance of missiles and spacecraft, and automotive stability control systems. In many of these applications, safety is critical, and measures must be taken to guard against failures of the sensor.

It is in general an object of the invention to provide a new and improved inertial rate sensor and method.

Another object of the invention is to provide an inertial rate sensor and method with improved clocking.

These and other objects are achieved in accordance with the invention by providing an inertial rate sensor and method in which a drive signal is applied to a vibratory rate sensing element, a pickup circuit is coupled to the rate sensing element for providing an output signal corresponding to movement of the rate sensing element, digital logic calibrates the rate sensor and detects the occurrence of faults in the rate sensor, the rate sensing element is utilized as a frequency reference for providing a system clock signal for the digital logic, a fixed phase relationship is maintained between vibration of the rate sensing element and the system clock signal, the system clock signal is filtered to eliminate responses to spurious transitions during a period following application of operating power to the sensor, and the digital logic is reset in synchronization with the system clock signal.

FIG. 1 is a block diagram of one embodiment of an inertial rate sensor incorporating the invention.

FIG. 2 is block diagram of the drive oscillator in the embodiment of FIG. 1.

FIG. 3 is a block diagram of the clock filter in the embodiment of FIG. 1.

FIG. 4 is a timing diagram illustrating the waveforms at different points in the clock filter of FIG. 3.

FIG. 5 is a block diagram of the reset circuit in the embodiment of FIG. 1.

FIG. 6 is a timing diagram illustrating the waveforms at different points in the reset circuit of FIG. 5.

As illustrated in FIG. 1, the rate sensor includes a quartz sensing element 11 in the form of a double-ended tuning fork. This tuning fork is fabricated of single crystal quartz material, and has an H-shaped configuration, with drive tines 12 at one end and pick-up tines 13 at the other. Each pair of tines is disposed symmetrically about the longitudinal axis 14 of the tuning fork.

The drive tines are driven to oscillate at the natural frequency of the tuning fork and in the plane of the tuning fork. When the tuning fork is subjected to rotation about its longitudinal axis, the Coriolis force causes the tines to deflect out of the plane of the fork, stimulating the pickup mode of oscillation. The drive and pickup signals are coupled to the tines in a conventional manner by the use of electrodes (not shown), with the drive signals stimulating piezoelectric vibration of the tines and the pickup signals being in the form of electric charge generated piezoelectrically in response to strain produced by the Coriolis force.

Although the sensing element is illustrated as being a double ended tuning fork, another type of vibratory sensing element, including a single ended tuning fork, can also be utilized, if desired.

The pickup signals pass through a charge amplifier 16, to a preamplifier 17, and then to a demodulator 18. The signals from the demodulator pass through a low pass filter 19 to a compensation summer 21 and then to an output amplifier 22, with the rate output signal appearing at the output of the output amplifier. With voltage inputs of +5 volts and 0 volts, the rate output is biased to +2.5 volts for zero input and swings to a more positive voltage for positive rate inputs and toward zero volts for a negative rate input. The +2.5 volt level is often referred to as virtual ground.

Compensation signals are applied to the summer to adjust the output signal for factors such as temperature and to make the system ratiometric so that the scale factor of the unit varies in direct proportion to the applied power, as described in U.S. Pat. No. 5,942,686.

The system includes digital logic 23 which operates in conjunction with an external EEPROM 24 whereby the unit can be calibrated electronically without the need for hand-soldered components. The digital logic also provides a built-in test function for detecting the occurrence of faults in the unit. Signals from the digital logic are applied to compensation summer 21 through a digital-to-analog converter 26 and to output amplifier 22.

The vibratory sensing element or tuning fork 11 is used as the clock reference for the digital logic, with clock signals derived from the drive circuit or oscillator 28 being applied to the digital logic through a clock filter 29. This reduces the size and cost of the rate sensor by eliminating the need for an external clock and thereby reducing the overall part count and circuit board area. It also simplifies the task of fault detection since monitoring tuning fork integrity automatically monitors the integrity of the clock signal. In addition, the clock signal is synchronous with the output signal, and there can be no aliased signals or beat tones at sum and difference frequencies.

In the preferred embodiment, the fundamental frequency of the tuning fork is used as the clock reference for the digital logic. Alternatively, a phase-locked loop can be utilized to generate a multiple of the fork drive frequency for faster signal processing. In either case, the frequency determining element is the same tuning fork that serves as the sensing element.

As illustrated in FIG. 2, the drive circuit or oscillator 28 comprises a loop which is sometimes referred to as an AGC (automatic gain control) servo loop. When the drive tines are oscillating, a current is generated across the drive electrodes. This current is passed through a current-to-voltage amplifier 31 to produce a voltage which is applied to the input of a demodulator 32. A voltage comparator 33 connected to the output of the current-to-voltage amplifier produces a square wave at the drive frequency. This square wave is applied to the control input of the demodulator, and with the demodulator operating at the drive frequency, its output includes a term at dc.

The dc term from the demodulator is applied to a summing circuit 34 where it is combined with a fixed scale factor reference voltage 36 and a programmable scale factor reference voltage 37. The output of the summing circuit is connected to the input of an integrator 38.

The output of the integrator will move either toward a more positive voltage or toward a more negative voltage if its input is non-zero. This means that in a steady state condition, the input to the integrator must, on average, be zero. Thus, the output of the demodulator must exactly cancel the sum of the two scale factor reference voltages. Since the output voltage of the demodulator represents the amplitude of oscillation of the drive mode of the tuning fork, the two scale factor reference voltages set the magnitude of the drive mode oscillation.

The rate sensing capability of the tuning fork depends on the Coriolis force which couples input rotation about the axis of symmetry of the drive tines to an out-of-plane torsional mode. The Coriolis force is proportional to the product of the rate of rotation and the velocity of the tines, and that velocity is proportional to the amplitude of the tine oscillation. Thus, as the tines are driven to oscillate with a greater amplitude of displacement and velocity, the response to rotation via the Coriolis force will be proportionally greater. Thus, the scale factor, or response per unit rotation of the tuning fork, increases proportionally with the drive amplitude.

In determining the amplitude of oscillation of the drive mode of the tuning fork, scale factor reference voltages 36, 37 also determine the scale factor of the device. The fixed voltage is used to set the nominal scale factor, and the programmable voltage is used for fine adjustment. This permits the scale factor of each unit to be corrected for minor variations in individual tuning fork characteristics so that each rate sensor produced can have the proper scale factor output.

The programmable data for setting the programmable scale factor reference voltage is derived from a digital coefficient stored in EEPROM 24 and accessed by digital logic 23. That data is converted to an analog voltage which is applied to the programmable bias voltage input of summing circuit 34. In one presently preferred embodiment, the range of adjustment of the programmable component of the scale factor reference is on the order of ±35 percent of the fixed component.

The voltage level at the output of integrator is monitored by a window comparator 39 which detects unacceptable conditions or failures in the drive loop. The window comparator comprises a pair of comparators 41, 42 and an inverting OR gate 43, with the outputs of the comparators being connected to the inputs of the inverting OR gate. The upper and lower voltage limits are set by reference voltages +REF and −REF which define the trip points of the circuit. The other two comparator inputs are connected together for receiving the signal from the integrator. The output of the inverting OR gate is passed through a low pass filter 44 and monitored by the built-in test logic.

As long as the output of the integrator is within the limits set by reference voltages, the output of the window comparator will be determined to be acceptable by the built-in test logic 46. If at any time the output of the integrator should fall outside these limits, the test logic will detect a failure and trigger output stage 22 to shift rapidly to the positive voltage rail, which is interpreted as a failure condition.

The types of failures which can be detected within the oscillator loop include a defective or broken tuning fork, an open electrical trace leading to or from the fork, a change in the fork mode "Q" factor caused by a leak in the backfill gas of the package in which the tuning fork is encapsulated, and a shorted or open feedback component across the integrator.

To permit failures of the integrator to be detected by the built-in test logic, the output of the integrator is combined with a bias voltage 48 in a summing circuit 49 to move the steady state output of the integrator away from virtual ground, i.e. the midpoint between the positive and negative supply voltages, to a desired value. This is necessary because if the feedback path across the integrator becomes shorted, the output of the integrator will remain at virtual ground, i.e. +2.5 volts for a system with supply voltages of +5 volts and 0 volts. In order to detect this failure, the acceptable range of integrator output voltages must be biased away from virtual ground, typically to a range of about +2.6 volts to +4.0 volts for normal operating conditions.

If the feedback path across the integrator becomes open, the integrator amplifier will pass all the double frequency components created by the demodulator. This double-frequency signal, when passed through the window comparator, will result in a stream of digital "ones" and "zeros" as the amplifier output transitions through the trip limits. Low pass filter 44 reduces this pulse stream to a dc voltage which is detected by the built-in test logic as a failure.

The output of summing circuit 49 is amplified by an amplifier 51 and applied to an amplitude modulator 52 to modulate the output voltage from voltage comparator 33. The output of the voltage comparator is a rail-to-rail square wave, and the modulator adjusts the peak-to-peak amplitude of that square wave to provide a variable drive voltage for the drive tines of the tuning fork.

The square wave from the modulator is applied to the drive tines through a multiplexer 53 which is controlled by a signal from the logic circuitry. It is also applied to the input of a bandpass filter 54 with a gain of 1.0 at its center frequency which is approximately equal to the natural frequency of the drive mode of the tuning fork. This filter significantly attenuates the harmonic content of the square wave, and produces another drive signal which is nearly a pure sine wave. That signal is applied to a second input of the multiplexer.

The peak-to-peak voltage of the square wave drive signal rises more rapidly and results in a faster turn-on than the sine wave, and is applied to the drive tines during the initial phase of turn-on to minimize turn-on time. Once the amplitude of the tuning fork oscillations reaches a level such that the output of integrator 38 exceeds the lower control limit of window comparator 39, the built-in test logic generates a command signal to the multiplexer to switch its output from the square wave to the sine wave. The relatively harmonic-free sine wave is then used to drive the tuning fork for the remainder of its operation until the next turn-on sequence.

This provides the advantages of both types of drive signals without the disadvantages of either. The square wave provides more rapid onset of fork oscillation and stabilization at the amplitude control level. However, it also has a high harmonic content which can, in some instances, couple to higher order modes of the tuning fork structure and cause undesired bias shifts in the sensor output. The sine wave is relatively free of such harmonics, but it rises more slowly and produces a slower turn-on than the square wave, and therefore is not as good for start-up operation.

It is important for the clock reference to be generated in such a way that it has a fixed phase relationship with respect to the phase of the tuning fork motion. If that phase relationship were to vary from one turn-on to the next, the logic would still function properly, but the difference in phase would likely result in differences in the bias offset of the sensor due to finite coupling of the clock signal into the output signal path. A fixed clock phase relationship ensures that if this coupling exists, it will have a fixed value from turn-on to turn-on.

The fixed phase relationship is provided by the clock filter 29 through which the clock signals are applied to the logic circuitry. As illustrated in FIG. 3, the clock filter comprises a pair of D-type flip-flops 56, 57 that are reset simultaneously to clear their outputs, designated QA and QB, respectively. These flip-flops trigger on positive-going clock edges, and the input clock signal is derived from the output of voltage comparator 33, with non-inverted clock input signal being applied to flip-flop 56 and the inverted clock input signal being applied to flip-flop 57 through an inverter 58.

A feedback loop comprising an integrator 59, a Schmitt trigger 60 and an inverter 61 is connected between the Q output and the D input of flip-flop 57. This causes clock input to be divided by 2 so that the signal QB at the output of flip-flop 57 is a square wave with a frequency equal to exactly one half that of the clock input.

Flip-flop 56 is slaved to flip-flop 57, with the delayed QB output signal from flip-flop 57 being applied to the D input of flip-flop 56 through an inverter 62. Thus, the signal QA at the output of flip-flop 56 is also a square wave with a frequency equal to exactly one half that of the clock input, and the outputs of the two flip-flops are always out-of-phase with each other by one-half of the input clock cycle.

The integrator and Schmitt trigger introduce a delay into the feedback which prevents multiple transitions from occurring in the clock output signal in the event that such transitions are present in the input clock signal. The delay prevents the flip-flops from making additional transitions for a fixed period of time after an initial transition at a first positive-going clock edge. This delay is illustrated in FIG. 4, and is on the order of 10 to 25 percent of the clock period. Inhibiting the flip-flops in this manner provides a clean output signal from a clock input which may contain multiple transitions within a short period after an initial transition. Such transitions can, for example, arise from an element such as a comparator which is utilized in the generation of the clock input, and they can occur throughout the operation of the sensor, not just at start-up.

The outputs QA and QB of flip-flops 56, 57, which are free of spurious transitions, are input to an exclusive-OR gate 63. Since these two signals are both at one-half the frequency of the clock input signal, they combine to produce a new clock signal at the same frequency as the clock input signal. Since the two flip-flops are slaved together and their QA and QB outputs are always out-of-phase with each other by one-half of the input clock cycle, the phase of the output clock signal from the filter always has a fixed relationship with respect to the clock signal input to the filter. This phase relationship is illustrated in FIG. 4.

FIG. 5 illustrates a reset circuit 64 which prevents an incorrect clock signal from being derived from a spurious oscillation occurring between the moment that power is applied to the sensor and the establishment of normal fork drive oscillation. This circuit includes a precision oscillator 66 which comprises a voltage comparator 67 with a resistor 68 and a capacitor 69 that determine the frequency of the oscillator. This frequency is significantly lower than the system clock frequency, and in one presently preferred embodiment, the system clock has a frequency of 10 KHz, and oscillator 66 operates at a frequency of 1 Khz.

As illustrated in FIG. 6, a finite time is required for the drive oscillator signal 71 to transition from some indeterminate frequency to its normal operating frequency. Waveform 72 illustrates the gradual rise in input voltage as the power is applied. When the input voltage reaches a threshold level, typically about 3.8 volts, a power-on reset pulse 73 is generated to provide the initial reset for the logic circuits.

The output of oscillator 66 is connected to the input of a 9-bit (divide-by-512) counter 74. The output of this counter is fed to control logic 77 which also receives an asynchronous reset signal from power-on reset circuit 78. Upon receipt of the signal from counter 74, the control logic toggles a comparator enable signal 79 to shut off voltage comparator 67, which then ceases to oscillate until another power-on reset occurs. The control logic also enables a reset pulse synchronizer 81 which delivers a synchronous reset signal that is synchronized with the clock signal from clock filter 29 which is known to be valid. The synchronous reset signal is combined with the asynchronous reset signal in an OR gate 82 to provide the system reset signal 83. As illustrated in FIG. 6, this signal transitions to a low state and then back to a high state in synchronization with the main system clock. Delaying delivery of the reset signal in this manner ensures that a final reset is given to all digital logic circuits after a clock which is known to be valid is derived from the tuning fork.

The control logic performs its function within two cycles of the signal from oscillator 66, yielding a total of 514 cycles for the operation of that oscillator, at which point it is fully disabled. This typically takes about one-half second.

The lower two waveforms show the system clock and the system reset signal on an expanded scale. As illustrated by these two waveforms, the negative-going transition of the system reset signal can be asynchronous to the system clock, and can occur several clock cycles prior to the positive-going transition, but the positive-going transition is synchronized to the system clock.

This reset circuit initializes the digital logic when power is applied to the sensor. Until that timing sequence is complete, the built-in test logic holds the signal from output stage 22 at the positive rail voltage. Thereafter, the output is allowed to assume the value corresponding to the rate of rotation of the sensor. When the output comes off the rail, it serves as an indication that the sensor is ready to use and will give valid data. The output will then return to the positive rail only if a failure is detected.

When a failure is detected and the output moves to the positive voltage rail, a BIT flag is latched and remains latched until another power turn-on sequence occurs. However, this latching of the BIT flag is inhibited prior to the completion of the turn-on sequence so that the transient conditions during start-up will not leave the BIT flag latched.

If the power applied to the unit should ever drop below the threshold of the power-on reset circuit, that circuit will automatically be re-triggered. That re-triggering provides an indication that a loss of power has occurred.

In a preferred embodiment, the circuitry for the rate sensor is constructed in integrated form as an application specific integrated circuit (ASIC). The tuning fork and the EEPROM are external to the ASIC, and compensation values can be loaded via computer interface into the EEPROM through the digital logic in the ASIC. In one presently preferred embodiment, the ASIC has only three connector terminals: +5 volts, ground (0 volts), and the output signal.

The invention has a number of important features and advantages. Using the sensing element itself as the clock reference for the system eliminates the need for a separate clock and thereby reduces the size and cost of the unit. The clock filter prevents incorrect clock signals from being delivered in response to spurious oscillations at start-up, and it also ensures the same phase relationship will always exist between the system clock and the oscillations of the tuning fork. The power-on reset circuit provides a reset signal that is accurately synchronized with the system clock.

It is apparent from the foregoing that a new and improved inertial rate sensor and method have been provided. While only certain presently preferred embodiments have been described in detail, as will be apparent to those familiar with the art, certain changes and modifications can be made without departing from the scope of the invention as defined by the following claims.

What is claimed is:

1. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, means utilizing the rate sensing element as a frequency reference for providing a system clock signal for the digital logic, means for maintaining a fixed phase relationship between vibration of the rate sensing element and the system clock signal, means for filtering the system clock signal to prevent clock pulses from being generated in response to spurious transitions in a waveform from which the clock signal is derived, and means for resetting the digital logic in synchronization with the system clock signal.

2. The inertial rate sensor of claim 1 wherein the means for maintaining a fixed phase relationship includes means for providing an input clock signal which is in phase with the vibrations of the rate sensing element means responsive to the input clock signal for generating a first signal having a frequency equal to one-half the frequency of the input clock signal and a rising edge which is synchronized with either a rising edge or a falling edge of the input clock signal, means for generating a second signal which has a frequency equal to one-half the frequency of the input clock signal and is out of phase with the first signal by one-half of an input clock cycle, and means for combining the first and second signals to provide the system clock signal.

3. The inertial rate sensor of claim 1 wherein the means for filtering the clock signal includes an oscillator having a frequency determined independently of the rate sensing element for delivering clock signals for an initial period of time following application of operating power to the sensor.

4. The inertial rate sensor of claim 1 wherein the means for filtering the clock signal includes means responsive to a transition in the clock signal for inhibiting further transitions for a period of time on the order of 10 to 25 percent of the period of the clock signal.

5. In a method of sensing inertial rate with a rate sensor having a vibratory rate sensing element and digital logic for calibrating the rate sensor and detecting faults, the steps of: applying a drive signal to the rate sensing element, monitoring signals from the rate sensing element to provide an output signal corresponding to movement of the rate sensing element, utilizing the rate sensing element as a frequency reference for providing a system clock signal to the digital logic, maintaining a fixed phase relationship between vibration of the rate sensing element and the system clock signal, filtering the system clock signal to prevent clock pulses from being generated in response to spurious transitions in a waveform from which the clock signal is derived, and resetting the digital logic in synchronization with the system clock signal.

6. The method of claim 5 wherein the fixed phase relationship is maintained by providing an input clock signal which is in phase with the vibrations of the rate sensing element, generating a first signal having a frequency equal to one-half the frequency of the input clock signal and a rising edge which is synchronized with either a rising edge or a falling edge of the input clock signal, generating a second signal which has a frequency equal to one-half the frequency of the input clock signal and is out of phase with the first signal by one-half of an input clock cycle, and combining the first and second signals to provide the system clock signal.

7. The method of claim 5 wherein the clock signal is filtered by obtaining clock signals from an oscillator whose frequency is determined independently of the rate sensing element for an initial period of time following application of operating power to the sensor.

8. The method of claim 5 wherein the clock signal is filtered by inhibiting further transitions from occurring for a period of time on the order of 10 to 25 percent of the clock period after the occurrence of a transition.

9. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, and means utilizing the rate sensing element as a frequency reference for providing a system clock signal for the digital logic.

10. The inertial rate sensor of claim 9 further including means for maintaining a fixed phase relationship between vibration of the rate sensing element and the system clock signal.

11. The inertial rate sensor of claim 10 wherein the means for maintaining a fixed phase relationship includes means for providing an input clock signal which is in phase with the vibrations of the rate sensing element, means responsive to the input clock signal for generating a first signal having a frequency equal to one-half the frequency of the input clock signal and a rising edge which is synchronized with either a rising edge or a falling edge of the input clock signal, means for generating a second signal which has a frequency equal to one-half the frequency of the input clock signal and is out of phase with the first signal by one-half of an input clock cycle, and means for combining the first and second signals to provide the system clock signal.

12. The inertial rate sensor of claim 9 including means for filtering the system clock signal to eliminate responses to spurious transitions in a waveform from which the clock signal is derived.

13. The inertial rate sensor of claim 9 including means responsive to a transition in the clock signal for inhibiting further transitions in the clock signal for a period of time on the order of 10 to 25 percent of the period of the clock signal.

14. The inertial rate sensor of claim 9 including means for resetting the digital logic in synchronization with the system clock signal.

15. In a method of sensing inertial rate with a rate sensor having a vibratory rate sensing element and digital logic for calibrating the rate sensor and detecting faults, the steps of: applying a drive signal to the rate sensing element, monitoring signals from the rate sensing element to provide an output signal corresponding to movement of the rate sensing element, and utilizing the rate sensing element as a frequency reference for providing a system clock signal to the digital logic.

16. The method of claim 15 further including the step of maintaining a fixed phase relationship between vibration of the rate sensing element and the system clock signal.

17. The method of claim 16 wherein the fixed phase relationship is maintained by providing an input clock signal which is in phase with the vibrations of the rate sensing element, generating a first signal having a frequency equal to one-half the frequency of the input clock signal and a rising edge which is synchronized with either a rising edge or a falling edge of the input clock signal, generating a second signal which has a frequency equal to one-half the frequency of the input clock signal and is out of phase with the first signal by one-half of an input clock cycle, and combining the first and second signals to provide the system clock signal.

18. The method of claim 15 including the step of filtering the system clock signal to eliminate responses to spurious transitions in a waveform from which the clock signal is derived.

19. The method of claim 15 including the step of inhibiting further transitions from occurring for a period of time on the order of 10 to 25 percent of the clock period after the occurrence of a transition.

20. The method of claim 15 including the step of resetting the digital logic in synchronization with the system clock signal.

21. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, and means for providing a system clock signal for the digital logic which has a fixed phase relationship to vibrations of the rate sensing element.

22. The inertial rate sensor of claim 21 wherein the means for providing the system clock signal includes means for providing an input clock signal which is in phase with the vibrations of the rate sensing element, means responsive to the input clock signal for generating a first signal having a frequency equal to one-half the frequency of the input clock signal and a rising edge which is synchronized with either a rising edge or a falling edge of the input clock signal, means for generating a second signal which has a frequency equal to one-half the frequency of the input clock signal and is out of phase with the first signal by one-half of an input clock cycle, and means for combining the first and second signals to provide the system clock signal.

23. The inertial rate sensor of claim 21 including means for filtering the system clock signal to eliminate responses to spurious transitions in a waveform from which the clock signal is derived.

24. The inertial rate sensor of claim 21 including means responsive to a transition in the clock signal for inhibiting further transitions in the clock signal for a period of time on the order of 10 to 25 percent of the period of the clock signal.

25. The inertial rate sensor of claim 21 including means for resetting the digital logic in synchronization with the system clock signal.

26. In a method of sensing inertial rate with a rate sensor having a vibratory rate sensing element and digital logic for calibrating the rate sensor and detecting faults, the steps of: applying a drive signal to the rate sensing element, monitoring signals from the rate sensing element to provide an output signal corresponding to movement of the rate sensing element, and providing a system clock signal for the digital logic which has a fixed phase relationship to vibrations of the rate sensing element.

27. The method of claim 26 wherein the system clock signal is provided by providing an input clock signal which is in phase with the vibrations of the rate sensing element, generating a first signal having a frequency equal to one-half the frequency of the input clock signal and a rising edge which is synchronized with either a rising edge or a falling edge of the input clock signal, generating a second signal which has a frequency equal to one-half the frequency of the input clock signal and is out of phase with the first signal by one-half of an input clock cycle, and combining the first and second signals to provide the system clock signal.

28. The method of claim 26 including the step of filtering the system clock signal to eliminate responses to spurious transitions in a waveform from which the clock signal is derived.

29. The method of claim 26 including the step of inhibiting transitions following a transition in the clock signal for a period of time on the order of 10 to 25 percent of the clock period.

30. The method of claim 26 including the step of resetting the digital logic in synchronization with the system clock signal.

31. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, means for providing a system clock signal for the digital logic which is free of responses to spurious transitions in a waveform from which the clock signal is derived.

32. The inertial rate sensor of claim 31 wherein the means for providing the system clock signal includes an oscillator having a frequency determined independently of the rate sensing element for delivering clock signals during an initial period following application of operating power.

33. The inertial rate sensor of claim 31 including means responsive to transition in the clock signal for inhibiting further transitions for a period of time on the order of 10 to 25 percent of the period of the clock signal.

34. The inertial rate sensor of claim 31 including means for resetting the digital logic in synchronization with the system clock signal.

35. In a method of sensing inertial rate with a vibratory rate sensor having a rate sensing element and digital logic for calibrating the rate sensor and detecting faults, the steps of: applying a drive signal to the rate sensing element, monitoring signals from the rate sensing element to provide an output signal corresponding to movement of the rate sensing element, and providing a system clock signal for the digital logic which is free of responses to spurious transitions during a period following application of operating power to the sensor.

36. The method of claim 35 including the step of obtaining clock pulses from an oscillator whose frequency is determined independently of the rate sensing element during an initial period following application of operating power.

37. The method of claim 35 including the step of inhibiting transitions following a transition in the clock signal for a period of time on the order of 10 to 25 percent of the clock period.

38. The method of claim 35 including the step of resetting the digital logic in synchronization with the system clock signal.

39. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, means for providing a system clock signal for the digital logic which is free of responses to spurious transitions which may occur during a period of time following a valid transition in the clock signal.

40. The inertial rate sensor of claim 39 wherein the means for providing the system clock signal includes means responsive to a transition in the clock signal for inhibiting further transitions in the clock signal for a period of time on the order of 10 to 25 percent of the period of the clock signal.

41. The inertial rate sensor of claim 39 including means for resetting the digital logic in synchronization with the system clock signal.

42. In a method of sensing inertial rate with a vibratory rate sensor having a rate sensing element and digital logic for calibrating the rate sensor and detecting faults, the steps of: applying a drive signal to the rate sensing element, monitoring signals from the rate sensing element to provide an output signal corresponding to movement of the rate sensing element, and providing a system clock signal for the digital logic which is free of responses to spurious transitions which may occur during a period of time following a valid transition in the clock signal.

43. The method of claim 42 including the step of inhibiting further transitions in the clock signal from occurring for a period of time on the order of 10 to 25 percent of the clock period after the occurrence of a transition.

44. The method of claim 42 including the step of resetting the digital logic in synchronization with the system clock signal.

45. In an inertial rate sensor: a vibratory rate sensing element having a natural frequency of resonance, a drive circuit for applying a drive signal to the rate sensing element, a pickup circuit coupled to the rate sensing element for providing an output signal corresponding to movement of the rate sensing element, digital logic for calibrating the rate sensor and detecting the occurrence of faults in the rate sensor, means for providing a system clock signal for the digital logic, and means for resetting the digital logic in synchronization with the system clock signal.

46. The inertial rate sensor of claim 45 wherein the means for resetting the digital logic includes an oscillator which operates for a predetermined number of cycles following receipt of a power-on reset signal, means responsive to a signal from the oscillator for generating a reset signal, means for synchronizing the reset signal with the system clock signal, and means for applying the synchronized reset signal to the digital logic.

47. In a method of sensing inertial rate with a rate sensor having a vibratory rate sensing element and digital logic for calibrating the rate sensor and detecting faults, the steps of: applying a drive signal to the rate sensing element, monitoring signals from the rate sensing element to provide an output signal corresponding to movement of the rate sensing element, providing a system clock signal for the digital logic, and means for resetting the digital logic in synchronization with the system clock signal.

48. The method of claim 47 wherein the digital logic is reset by operating an oscillator for a predetermined number of cycles following receipt of a power-on reset signal, generating a reset signal in response to a signal from the oscillator, synchronizing the reset signal with the system clock signal, and applying the synchronized reset signal to the digital logic.

* * * * *